US012542086B2

(12) United States Patent
Chang et al.

(10) Patent No.: US 12,542,086 B2
(45) Date of Patent: Feb. 3, 2026

(54) DISPLAY PANEL AND DISPLAY DEVICE

(71) Applicant: TCL CHINA STAR OPTOELECTRONICS TECHNOLOGY CO., LTD., Guangdong (CN)

(72) Inventors: Shuming Chang, Guangdong (CN); Yating Wen, Guangdong (CN); Weisheng Zheng, Guangdong (CN); Yuning Zhang, Guangdong (CN); Qian Wang, Guangdong (CN); Shijie Deng, Guangdong (CN); Zhaoming Liang, Guangdong (CN); Fan Chen, Guangdong (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 134 days.

(21) Appl. No.: 18/523,941

(22) Filed: Nov. 30, 2023

(65) Prior Publication Data

US 2025/0140158 A1 May 1, 2025

(30) Foreign Application Priority Data

Oct. 26, 2023 (CN) ......................... 202311400333.9

(51) Int. Cl.
*G09G 3/20* (2006.01)

(52) U.S. Cl.
CPC ... *G09G 3/2092* (2013.01); *G09G 2310/0267* (2013.01); *G09G 2310/0275* (2013.01); *G09G 2310/08* (2013.01); *G09G 2320/0247* (2013.01)

(58) Field of Classification Search
CPC ......... G09G 3/2092; G09G 2310/0267; G09G 2310/0275; G09G 2310/08; G09G 2320/0247
See application file for complete search history.

(56) References Cited

U.S. PATENT DOCUMENTS

| | | | | |
|---|---|---|---|---|
| 10,762,822 | B2 * | 9/2020 | Huang | G09G 3/2003 |
| 2020/0380903 | A1 * | 12/2020 | Dong | G09G 3/3225 |
| 2024/0071272 | A1 * | 2/2024 | Wang | G09G 3/20 |

* cited by examiner

*Primary Examiner* — Kenneth B Lee, Jr.
(74) *Attorney, Agent, or Firm* — PV IP PC; Peter S. Stecher; Wei Te Chung

(57) ABSTRACT

A display panel and a display device are disclosed. The display panel includes a plurality of scan lines, a plurality of data lines, and a plurality of sub-pixels. Each of the scan lines is electrically connected to a row of the sub-pixels. The plurality of sub-pixels include a first pixel column and a second pixel column. The first pixel column and the second pixel column are arranged adjacent to each other. The first pixel column includes a plurality of first pixel units. The second pixel column includes a plurality of second pixel units. Each of the first pixel unit and the second pixel unit includes three sub-pixels, and colors of the three sub-pixels are different. At least two adjacent first pixel units and at least two adjacent second pixel units are electrically connected to a same data line.

19 Claims, 4 Drawing Sheets

DISPLAY PANEL AND DISPLAY DEVICE

CROSS REFERENCE TO RELATED APPLICATIONS

This application claims priority to Chinese Patent Application No. 202311400333.9, filed on Oct. 26, 2023, and entitled "DISPLAY PANEL AND DISPLAY DEVICE". The entire disclosures of the above application are incorporated herein by reference.

TECHNICAL FIELD

The present disclosure relates to the field of display technologies, and in particular to a display panel and a display device.

BACKGROUND

At present, display panels can not only meet daily normal viewing needs of users, but also support high refresh rate display needs in entertainment mode. Existing ultra-high-definition display panel with tri-gate and three-dot flip architecture is affected by a panel architecture, so that when the display panel switches from a low refresh rate (such as 60 Hz) to a high refresh rate (such as 120 Hz), pixel misalignment is prone to occur, resulting in abnormal display problems.

SUMMARY

The present disclosure provides a display panel and a display device. The display panel and the display device can improve a display abnormality problem caused by pixel misalignment when the display panel switches from a first preset refresh rate to a second preset refresh rate.

In one aspect, an embodiment of the present disclosure provides a display panel including a plurality of scan lines, a plurality of data lines, and a plurality of sub-pixels. The plurality of scan lines are arranged along a first direction. The plurality of data lines are arranged along a second direction. The second direction intersects the first direction. Each of the scan lines is electrically connected to a row of the sub-pixels arranged along the second direction, the plurality of sub-pixels include a first pixel column and a second pixel column, the first pixel column and the second pixel column are arranged adjacent to each other along the second direction, the first pixel column includes a plurality of first pixel units arranged along the first direction, the second pixel column includes a plurality of second pixel units arranged along the first direction, each of the first pixel unit and the second pixel unit includes three sub-pixels arranged along the first direction, and colors of the three sub-pixels are different from each other. At least two adjacent first pixel units and at least two adjacent second pixel units are electrically connected to a same data line.

Alternatively, in some embodiments of the present disclosure, the display panel at least includes a first display mode and a second display mode, in the first display mode, a refresh rate of the display panel is a first preset refresh rate, in the second display mode, the refresh rate of the display panel is a second preset refresh rate, the second preset refresh rate is N times the first preset refresh rate, and N is a positive integer greater than 1; and in the second display mode, the sub-pixels of a same color in the at least two adjacent first pixel units electrically connected to the same data line are turned on simultaneously, or the sub-pixels of the same color in the at least two adjacent second pixel units electrically connected to the same data line are turned on simultaneously.

Alternatively, in some embodiments of the present disclosure, a period during which the display panel displays one frame of a display image includes a scan cycle, the scan cycle includes a first sub-scan cycle and a second sub-scan cycle that are continuous in time, a number of the first pixel units scanned in the first sub-scan cycle is equal to a number of second pixel units scanned in the second sub-scan cycle.

Alternatively, in some embodiments of the present disclosure, each of the first pixel unit and the second pixel unit includes a first sub-pixel, a second sub-pixel, and a third sub-pixel arranged along the first direction; the display panel further includes a first gate driving unit, a second gate driving unit, and a third gate driving unit connected in cascade, the first gate driving unit receives a first clock signal and is electrically connected to a corresponding first sub-pixel through the scan line, the second gate driving unit receives a second clock signal and is electrically connected to a corresponding second sub-pixel through the scan line, and the third gate driving unit receives a third clock signal and is electrically connected to a corresponding third sub-pixel through the scan line; a time difference between a time when the first clock signal switches from a low level to a high level and a time when the second clock signal switches from the low level to the high level ranges from 2 microseconds to 3 microseconds, and a time difference between the time when the second clock signal switches from the low level to the high level and a time when the third clock signal switches from the low level to the high level ranges from 2 microseconds to 3 microseconds.

Alternatively, in some embodiments of the present disclosure, the second clock signal is turned on while the first clock signal remains at the high level, the second clock signal is turned off while the third clock signal remains at the high level, and the third clock signal switches from the low level to the high level when the first clock signal switches from the high level to the low level.

Alternatively, in some embodiments of the present disclosure, every two of the first pixel units are arranged adjacently along the first direction, and every two of the second pixel units are arranged adjacently along the first direction, and at least part of the first pixel units and the second pixel units are alternatively arranged along the first direction.

Alternatively, in some embodiments of the present disclosure, the first clock signal switches from the low level to the high level while the third clock signal remains at the high level.

Alternatively, in some embodiments of the present disclosure, a number of the first pixel units and a number of the second pixel units electrically connected to the same data line are equal.

Alternatively, in some embodiments of the present disclosure, data signals transmitted by two adjacent data lines have opposite polarities, and at least some of the data lines transmit data signals to corresponding sub-pixel at different times.

Alternatively, in some embodiments of the present disclosure, a number of the second pixel units adjacently arranged along the first direction corresponds to a number of the first pixel units adjacently arranged along the first direction.

In another aspect, the present disclosure provides a display device including a display panel and a driving circuit. The display panel is electrically connected to the driving circuit, and the driving circuit is configured to drive the display panel. The display panel includes a plurality of scan lines, a plurality of data lines, and a plurality of sub-pixels. The plurality of scan lines are arranged along a first direction. The plurality of data lines are arranged along a second direction. The second direction intersects the first direction. Each of the scan lines is electrically connected to a row of the sub-pixels arranged along the second direction, the plurality of sub-pixels include a first pixel column and a second pixel column, the first pixel column and the second pixel column are arranged adjacent to each other along the second direction, the first pixel column includes a plurality of first pixel units arranged along the first direction, the second pixel column includes a plurality of second pixel units arranged along the first direction, each of the first pixel unit and the second pixel unit includes three sub-pixels arranged along the first direction, and colors of the three sub-pixels are different from each other. At least two adjacent first pixel units and at least two adjacent second pixel units are electrically connected to a same data line.

Alternatively, in some embodiments of the present disclosure, the driving circuit includes a system chip and a timing controller, the system chip is electrically connected to the timing controller, and the timing controller is electrically connected to the display panel. The system chip is configured to send a command to switch a refresh rate to the timing controller, the timing controller is configured to send a feedback signal to the system chip according to the command to switch the refresh rate, the system chip is also configured to determine whether a current refresh rate is the same as a refresh rate after switching based on the feedback signal, in response to the current refresh rate being different from the refresh rate after switching, driving data corresponding to the refresh rate after switching is sent to the timing controller, and the timing controller is also configured to provide the display panel with scanning signals and data signals corresponding to the refresh rate after switching according to the driving data, so as to control a display image of the display panel.

Alternatively, in some embodiments of the present disclosure, the display panel at least includes a first display mode and a second display mode, in the first display mode, a refresh rate of the display panel is a first preset refresh rate, in the second display mode, the refresh rate of the display panel is a second preset refresh rate, the second preset refresh rate is N times the first preset refresh rate, and Nis a positive integer greater than 1; and in the second display mode, the sub-pixels of a same color in the at least two adjacent first pixel units electrically connected to the same data line are turned on simultaneously, or the sub-pixels of the same color in the at least two adjacent second pixel units electrically connected to the same data line are turned on simultaneously.

Alternatively, in some embodiments of the present disclosure, a period during which the display panel displays one frame of a display image includes a scan cycle, the scan cycle includes a first sub-scan cycle and a second sub-scan cycle that are continuous in time, a number of the first pixel units scanned in the first sub-scan cycle is equal to a number of second pixel units scanned in the second sub-scan cycle.

Alternatively, in some embodiments of the present disclosure, each of the first pixel unit and the second pixel unit includes a first sub-pixel, a second sub-pixel, and a third sub-pixel arranged along the first direction; the display panel further includes a first gate driving unit, a second gate driving unit, and a third gate driving unit connected in cascade, the first gate driving unit receives a first clock signal and is electrically connected to a corresponding first sub-pixel through the scan line, the second gate driving unit receives a second clock signal and is electrically connected to a corresponding second sub-pixel through the scan line, and the third gate driving unit receives a third clock signal and is electrically connected to a corresponding third sub-pixel through the scan line; a time difference between a time when the first clock signal switches from a low level to a high level and a time when the second clock signal switches from the low level to the high level ranges from 2 microseconds to 3 microseconds, and a time difference between the time when the second clock signal switches from the low level to the high level and a time when the third clock signal switches from the low level to the high level ranges from 2 microseconds to 3 microseconds.

Alternatively, in some embodiments of the present disclosure, the second clock signal is turned on while the first clock signal remains at the high level, the second clock signal is turned off while the third clock signal remains at the high level, and the third clock signal switches from the low level to the high level when the first clock signal switches from the high level to the low level.

Alternatively, in some embodiments of the present disclosure, every two of the first pixel units are arranged adjacently along the first direction, and every two of the second pixel units are arranged adjacently along the first direction, and at least part of the first pixel units and the second pixel units are alternatively arranged along the first direction.

Alternatively, in some embodiments of the present disclosure, the first clock signal switches from the low level to the high level while the third clock signal remains at the high level.

Alternatively, in some embodiments of the present disclosure, a number of the first pixel units and a number of the second pixel units electrically connected to the same data line are equal.

Alternatively, in some embodiments of the present disclosure, data signals transmitted by two adjacent data lines have opposite polarities, and at least some of the data lines transmit data signals to corresponding sub-pixel at different times.

The display panel provided by the present disclosure includes the plurality of scan lines, the plurality of data lines, and the plurality of sub-pixels. The plurality of scan lines are arranged along the first direction. The plurality of data lines are arranged along the second direction. The second direction intersects the first direction. Each of the scan lines is electrically connected to a row of the sub-pixels arranged along the second direction, the plurality of sub-pixels include the first pixel column and the second pixel column, the first pixel column and the second pixel column are arranged adjacent to each other along the second direction, the first pixel column includes the plurality of first pixel units arranged along the first direction, the second pixel column includes the plurality of second pixel units arranged along the first direction, each of the first pixel unit and the second pixel unit includes three sub-pixels arranged along the first direction, and colors of the three sub-pixels are different from each other. At least two adjacent first pixel units and at least two adjacent second pixel units are electrically connected to the same data line. The display panel provided by the present disclosure uses the above settings so that the same data line is electrically connected to the at least two adjacent first pixel units and the at least two adjacent second pixel units. Thus, when the display panel switches from the first preset refresh rate to the second preset refresh rate, the sub-pixels of the same color in the at least two first pixel units of the first pixel column can be scanned at the same time. Alternatively, the sub-pixels of the same color in the at least two second pixel units of the second pixel column are scanned at the same time. Therefore, the display panel is controlled to display multiple sub-pixels simultaneously at the second preset refresh rate in the same pixel column to prevent pixel misalignment, thereby improving the problem of abnormal display caused by pixel misalignment.

DETAILED DESCRIPTION OF ILLUSTRATED EMBODIMENTS

The technical solutions in the embodiments of the present disclosure will be described below with reference to the accompanying drawings in the embodiments of the present disclosure. The described technical solution is only used to explain and illustrate the idea of the present disclosure and should not be regarded as limiting the protection scope of the present disclosure.

The various embodiments provided by the present disclosure are similar, and features in different embodiments can be combined with each other.

In an embodiment of the present disclosure, a display panel at least includes a first display mode and a second display mode. The first display mode corresponds to a first preset refresh rate. The second display mode corresponds to a second preset refresh rate. The first preset refresh rate is less than the second preset refresh rate, and the second preset refresh rate is N times the first preset refresh rate. N is a positive integer greater than 1, for example, N is 1, 2, 3, 4, etc. Specifically, a value of the first preset refresh rate ranges from 0 Hz to 100 Hz, that is, the value of the first preset refresh rate includes 0 Hz, 10 Hz, 20 Hz, 30 Hz, 40 Hz, 50 Hz, 60 Hz, 70 Hz, 80 Hz, 90 Hz, and 100 Hz. Preferably, the value of the first preset refresh rate is 60 Hz.

In the embodiment of the present disclosure, a value of the second preset refresh rate ranges from 110 Hz to 360 Hz, that is, the value of the second preset refresh rate includes 110 Hz, 120 Hz, 130 Hz, 140 Hz, 150 Hz, 160 Hz, 170 Hz, 180 Hz, 190 Hz, 200 Hz, 210 Hz, 220 Hz, 230 Hz, 240 Hz, 250 Hz, 260 Hz, 270 Hz, 280 Hz, 290 Hz, 300 Hz, 310 Hz, 320 Hz, 330 Hz, 340 Hz, 350 Hz, and 360 Hz. Preferably, the value of the second preset refresh rate is 120 Hz.

Figure 1:
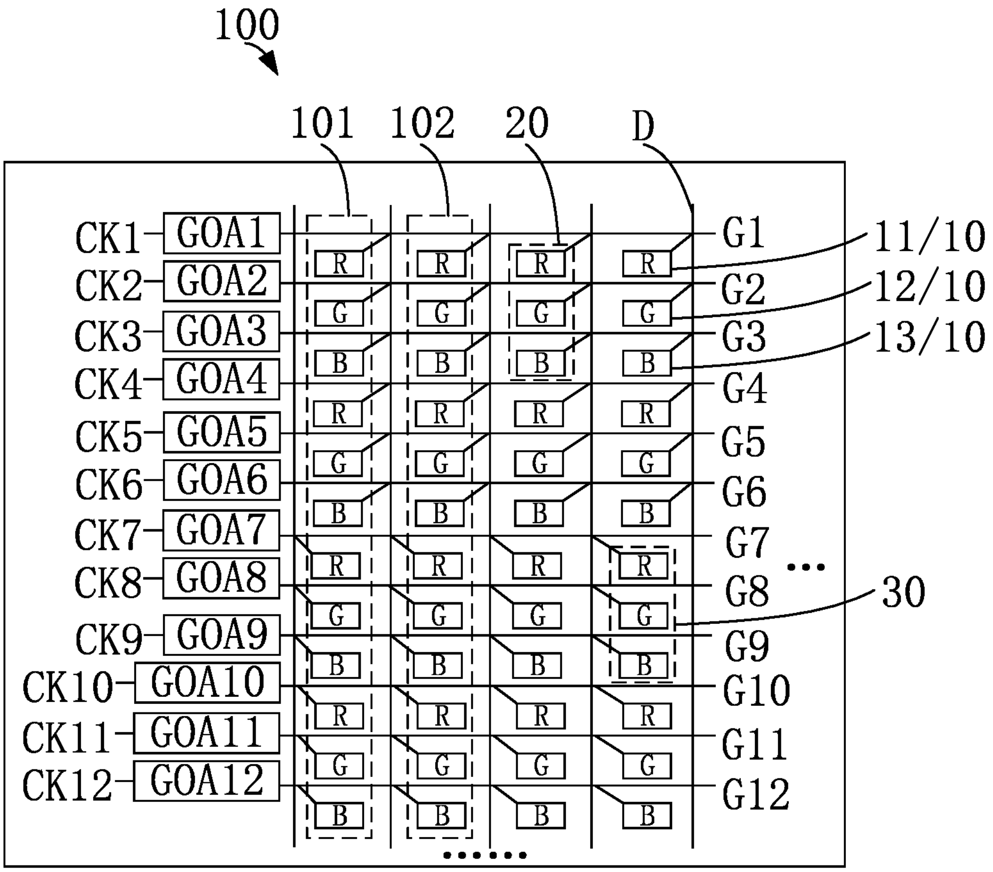
FIG. 1 is a schematic diagram of a display panel of a first embodiment of the present disclosure.

As shown in FIG. 1, an embodiment of the present disclosure provides a display panel 100 including: a plurality of scan lines G, a plurality of data lines D, and a plurality of sub-pixels 10. The plurality of scan lines G are arranged along a first direction Y. The plurality of data lines D are arranged along a second direction X. The second direction X intersects the first direction Y. Each of the scan lines G is electrically connected to a row of the sub-pixels 10 arranged along the second direction X. The plurality of sub-pixels 10 are divided into a first pixel column 101 and a second pixel column 102. The first pixel column 101 and the second pixel column 102 are arranged adjacent to each other along the second direction X. The first pixel column 101 includes a plurality of first pixel units 20 arranged along the first direction Y. The second pixel column 102 includes a plurality of second pixel units 30 arranged along the first direction Y. Each of the first pixel unit 20 and the second pixel unit 30 includes three sub-pixels 10 arranged along the first direction Y. Colors of the three sub-pixels 10 are different from each other. At least two adjacent first pixel units 20 and at least two adjacent second pixel units 30 are electrically connected to the same data line D.

In the display panel 100 provided in the embodiment of the present disclosure, at least two adjacent first pixel units 20 and at least two adjacent second pixel units 30 are electrically connected to the same data line D, such that when the display panel 100 switches from the first preset refresh rate to the second preset refresh rate, the sub-pixels 10 of the same color in at least two first pixel units 20 of the first pixel column 101 can be scanned at the same time. Alternatively, the sub-pixels 10 of the same color in at least two second pixel units 30 of the second pixel column 102 are scanned at the same time. Therefore, the multiple sub-pixels 10 displayed simultaneously by the display panel 100 under the second preset refresh rate are located in the same pixel column to prevent pixel misalignment and improve display abnormalities caused by the pixel misalignment.

In embodiments of the present disclosure, every two first pixel units 20 are arranged adjacently along the first direction Y, every two second pixel units 30 are arranged adjacently along the first direction Y, and every two first pixel units 20 and every two second pixel units 30 are alternately arranged along the first direction Y. Specifically, every M first pixel units 20 are adjacent along the first direction Y, and every M second pixel units 30 are adjacent along the first direction Y, and every M first pixel units 20 and every M second pixel units 30 are alternately arranged along the first direction Y. M is a positive integer greater than or equal to 2, for example, M is 2, 3, 4, etc.

In the embodiment of the present disclosure, a number of the first pixel units 20 adjacently arranged along the first direction Y can be adjusted accordingly according to the value of the second preset refresh rate of the display panel 100 (the value of the first preset refresh rate is 60 Hz). For example, when the value of the first preset refresh rate of display panel 100 is 120 Hz, the number of the first pixel units 20 adjacently arranged along the first direction Y is 2N. When the value of the second preset refresh rate of the display panel 100 is 180 Hz, the number of the first pixel units 20 adjacently arranged along the first direction Y is 3N. When the value of the second preset refresh rate of the display panel 100 is 240 Hz, the number of the first pixel units 20 adjacently arranged along the first direction Y is 4N. When the value of the second preset refresh rate of the display panel 100 is 360 Hz, the number of the first pixel units 20 adjacently arranged along the first direction Y is 6N. N is a positive integer greater than or equal to 1, for example, N is 1, 2, 3, 4, etc.

A number of the second pixel units 30 adjacently arranged along the first direction Y corresponds to a number of the first pixel units 20 adjacently arranged along the first direction Y. For example, the number of the first pixel units 20 adjacently arranged along the first direction Y is 2N, and the number of the second pixel units 30 adjacently arranged along the first direction Y is also 2N. The number of the first pixel units 20 adjacently arranged along the first direction Y is 3N, and the number of the first pixel units 20 adjacently arranged along the first direction Y is also 3N. This prevents the display panel 100 from displaying abnormalities caused by pixel misalignment at the second preset refresh rate. Moreover, the first pixel units 20 and the second pixel units 30 are alternately arranged along the first direction Y, which can reduce a loss of display resolution and ensure the display quality of the display panel 100.

In the embodiment of the present disclosure, the display panel at least includes a first display mode and a second display mode. In the first display mode, a refresh rate of the display panel is a first preset refresh rate. In the second display mode, the refresh rate of the display panel is a second preset refresh rate. The second preset refresh rate is N times the first preset refresh rate. N is a positive integer greater than 1. For example, the first preset refresh rate is 60 Hz and the second preset refresh rate is 120 Hz. In the second display mode, the sub-pixels 10 of the same color in at least two adjacent first pixel units 20 electrically connected to the same data line D are turned on simultaneously. For example, red sub-pixels 10 in two adjacent first pixel units 20 electrically connected to the same data line D are turned on at the same time. Alternatively, the sub-pixels 10 of the same color in at least two adjacent second pixel units 30 electrically connected to the same data line D are turned on simultaneously. For example, green sub-pixels 10 in two adjacent second pixel units 30 electrically connected to the same data line D are turned on at the same time.

In the embodiment of the present disclosure, each of a row of the first sub-pixels, a row of the second sub-pixels, and a row of the third sub-pixels is electrically connected to one scan line G.

In the embodiment of the present disclosure, the display panel 100 also includes first gate driving units (GOA1, GOA4, GOA7, GOA10, etc.), second gate driving units (GOA2, GOA5, GOA8, GOA11, etc.) and third gate driving units (GOA3, GOA6, GOA9, GOA12, etc.) which are cascade-connected. The first gate driving unit GOA1, the second gate driving unit GOA2, and the third gate driving unit GOA3 arranged along the first direction Y are respectively electrically connected to clock signal lines (CK1, CK2, CK3, CK4, CK5, CK6, CK7, CK8, CK9, CK10, CK11, and CK12, etc.) The clock signal lines (CK1, CK4, CK7, CK10, etc.) transmit first clock signals (ck1, ck4, ck7, ck10, etc.) to the first gate driving units GOA1. The clock signal lines (CK2, CK5, CK8, CK11, etc.) transmit the second clock signals (ck2, ck5, ck8, ck11, etc.) to the second gate driving units GOA2. The clock signal lines (CK3, CK6, CK9, CK12, etc.) transmit the third clock signals (ck3, ck6, ck9, ck12, etc.) to the third gate driving units GOA3.

In the embodiment of the present disclosure, each of the first pixel unit 20 and the second pixel unit 30 includes a first sub-pixel 11, a second sub-pixel 12, and a third sub-pixel 13 arranged along the first direction Y. The first gate driving unit (GOA1, GOA4, GOA7, GOA10, etc.) receives the first clock signal (ck1, ck4, ck7, ck10, etc.) and is electrically connected to the corresponding first sub-pixel 11 through the scan line G. The second gate driving unit (GOA2, GOA5, GOA8, GOA11, etc.) receives the second clock signal (ck2, ck5, ck8, ck11, etc.) and is electrically connected to the corresponding second sub-pixel 12 through the scan line G. The third gate driving unit (GOA3, GOA6, GOA9, GOA12, etc.) receives the third clock signal (ck3, ck6, ck9, ck12, etc.) and is electrically connected to the corresponding third sub-pixel 13 through scan line G. In the first clock signal, the second clock signal, and the third clock signal connected to the adjacent first gate driving unit, the second gate driving, unit and the third gate driving unit, a time difference between a time when the first clock signal (ck1, ck4, ck7, ck10, etc.) switches from a low level to a high level and a time when the second clock signal (ck2, ck5, ck8, ck11, etc.) switches from the low level to the high level ranges from 2 microseconds to 3 microseconds, and a time difference between the time when the second clock signal (ck2, ck5, ck8, ck11, etc.) switches from the low level to the high level and a time when the third clock signal (ck3, ck6, ck9, ck12, etc.) switches from the low level to the high level ranges from 2 microseconds to 3 microseconds.

Specifically, the present disclosure does not specifically limit the number of the clock signal lines. Those skilled in the art can adjust the number of the clock signal lines according to actual needs. For example, the number of the clock signal lines can also be 6, 8, or 10, etc.

Specifically, colors of the first sub-pixel 11, the second sub-pixel 12, and the third sub-pixel 13 are different from each other. For example, the colors of the first sub-pixel 11, the second sub-pixel 12, and the third sub-pixel 13 are red, green and, blue, respectively. The plurality of sub-pixels 10 are divided into multiple sub-pixel row repeating units. The sub-pixel 10 repeating unit includes a first sub-pixel row, a second sub-pixel row, and a third sub-pixel row. The first sub-pixel row includes multiple first sub-pixels 11. The second sub-pixel row includes multiple second sub-pixels 12. The third sub-pixel row includes multiple third sub-pixels 13. The data lines D are electrically connected to a corresponding column of the sub-pixels 10.

In the embodiment of the present disclosure, a number of the first pixel units 20 and a number of the second pixel units 30 electrically connected to the same data line D are equal. Specifically, the number of the first pixel units 20 electrically connected to each data line D is equal to the number of second pixel units 30.

In the embodiment of the present disclosure, the data signals transmitted by two adjacent data lines D have opposite polarities, and at least some of the data lines D transmit the data signals to the sub-pixels 10 at different times. By setting the opposite polarities of the data signals transmitted by the two adjacent data lines D, coupling capacitances between the sub-pixel 10 and the two adjacent data lines D can be eliminated and the display quality can be improved. At least some of the data lines D transmit the data signals to the sub-pixels 10 at different times, causing charging times of the sub-pixels 10 to be different, and thus the display time are different, which is conducive to displaying the specified sub-pixels 10 within a preset time to display a preset frame of a display image.

Figure 2:
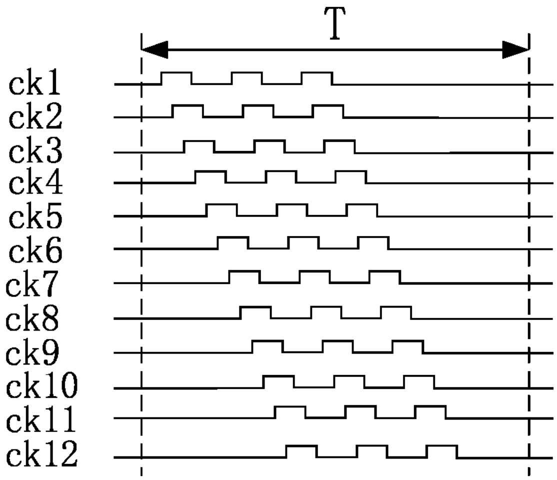
FIG. 2 is a first driving timing diagram of a display panel of an embodiment of the present disclosure.

As shown in FIG. 1 and FIG. 2, the display panel 100 is controlled under the first preset refresh rate, the first clock signals (ck1, ck4, ck7, ck10, etc.), the second clock signals (ck2, ck5, ck8, ck11, etc.), and the third clock signals (ck3, ck6, ck9, ck12, etc.) switch from low level to high level in sequence (ck1, ck2, ck3, ck4, ck5, ck6, ck7, ck8, ck9, ck10, ck11, ck12, etc.). Correspondingly, multiple scan lines G in the display panel are conducted line by line, and multiple sub-pixels 10 are charged row by row.

Figure 3:
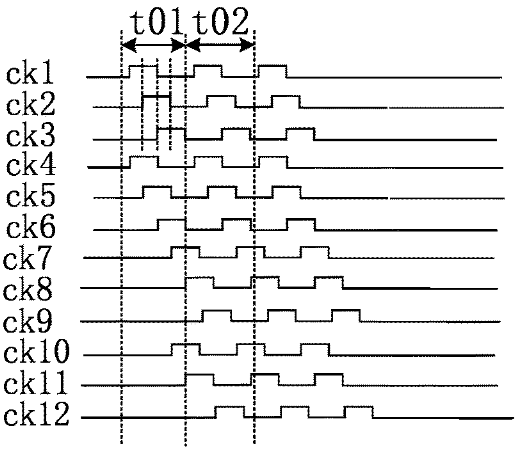
FIG. 3 is a second driving timing diagram of a display panel of an embodiment of the present disclosure.

As shown in FIG. 1 and FIG. 3, a period during which the display panel 100 displays one frame of a display image includes at least one scan cycle T. The scan cycle T includes a first sub-scan cycle t01 and a second sub-scan cycle t02 that are continuous in time. A number of the first pixel units 20 scanned in the first sub-scan cycle t01 is equal to a number of the second pixel units 30 scanned in the second sub-scan cycle t02.

In the embodiment of the present disclosure, the second clock signal (ck2, ck5, ck8, ck11, etc.) is turned on while the corresponding first clock signal (ck1, ck4, ck7, ck10, etc.) remains at the high level. The second clock signal (ck2, ck5, ck8, ck11, etc.) is turned off while the corresponding third clock signal (ck3, ck6, ck9, ck12, etc.) remains at the high level. The third clock signal (ck3, ck6, ck9, ck12, etc.) switches from the low level to the high level when the first clock signal (ck1, ck4, ck7, ck10, etc.) switches from the high level to the low level. For example, the second clock signal ck2 is turned on while the corresponding first clock signal ck1 remains at the high level, and the second clock signal ck2 is turned off while the third clock signal ck3 remains at the high level. The third clock signal ck3 switches from the low level to the high level when the first clock signal ck1 switches from the high level to the low level.

In the embodiment of the present disclosure, in the first sub-scan cycle t01, the first clock signal lines (CK1 and CK4) simultaneously transmit the first clock signals (ck1 and ck4) with the high level to the corresponding first gate driving units (GOA1 and GOA4), the sub-pixels 10 controlled by a first scan line G1 and a fourth scan line G4 are thus turned on at the same time. Sequentially, the second clock signal lines (CK2 and CK5) simultaneously transmit the second clock signal (ck2 and ck5) with the high level to the corresponding second gate driving units (GOA2 and GOA5), the sub-pixels 10 controlled by a second scan line G2 and a fifth scan line G5 are thus turned on at the same time. The third clock signal lines (CK3 and CK6) simultaneously transmit the third clock signals (ck3 and ck6) with the high level to the corresponding third gate driving units (GOA3 and GOA6), the sub-pixels 10 controlled by a third scan line G3 and a sixth scan line G6 are thus turned on at the same time. In the second sub-scan cycle t02, the first clock signal lines (CK7 and CK10) simultaneously transmit the first clock signals (ck7 and ck10) with the high level to the corresponding first gate driving units (GOA7 and GOA10), the sub-pixels 10 controlled by a seventh scan line G7 and a tenth scan line G10 are thus turned on at the same time. Sequentially, the second clock signal lines (CK8 and CK11) simultaneously transmit the second clock signals (ck8 and ck11) with the high level to the corresponding second gate driving units (GOA8 and GOA11), the sub-pixels 10 controlled by an eighth scan line G8 and an eleventh scan line G11 are thus turned on at the same time. The third clock signal lines (CK9 and CK12) simultaneously transmit the third clock signals (ck9 and ck12) with the high level to the corresponding third gate driving units (GOA9 and GOA12), the sub-pixels 10 controlled by a ninth scan line G9 and a twelfth scan line G12 are thus turned on at the same time.

Figure 4:
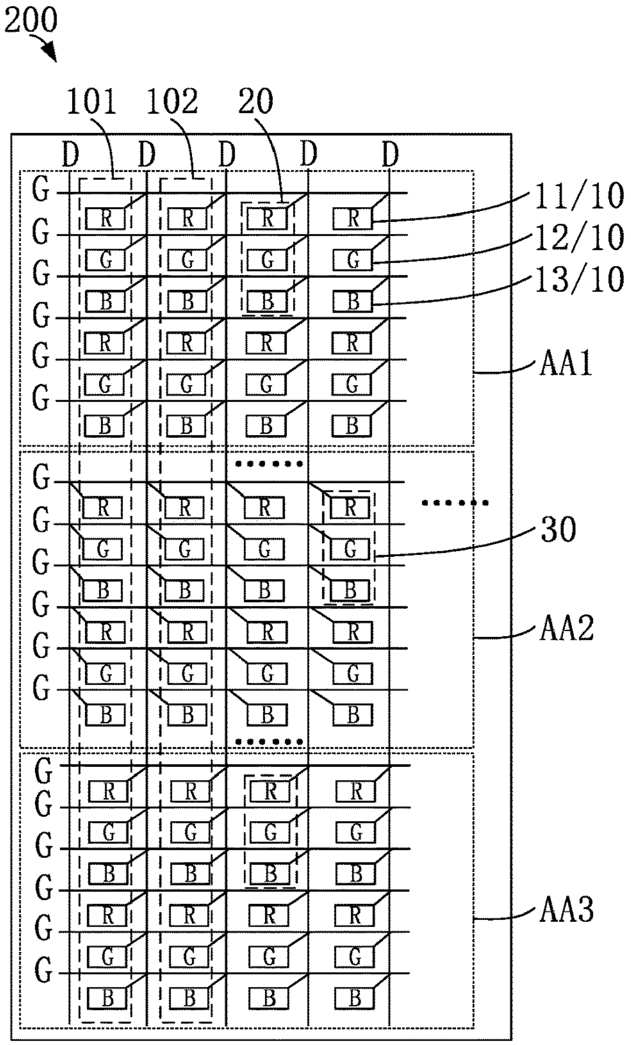
FIG. 4 is a schematic diagram of a display panel of a second embodiment of the present disclosure.

As shown in FIG. 4, an embodiment of the present disclosure provides a display panel 200. Differences between the display panel 200 and the display panel 100 are as follows. The display panel 200 includes a first display area AA1, a second display area AA2, and a third display area AA3 arranged along the first direction Y. The second display area AA2 is disposed between the first display area AA1 and the second display area AA2. The first display area AA1 and the third display area AA3 are provided with at least two first pixel units 20, and the second display area AA2 is provided with at least two second pixel units 30.

In the embodiment of the present disclosure, a number of the first pixel units 20 in the first display area AA1 and the third display area AA3 can be adjusted accordingly according to the value of the second preset refresh rate of the display panel (the value of the first preset refresh rate is 60 Hz). For example, when the value of the second preset refresh rate of the display panel 200 is 120 Hz, the number of the first pixel units 20 in the first display area AA1 and the third display area AA3 is 2N. When the value of the second preset refresh rate of the display panel 200 is 180 Hz, the number of the first pixel units 20 in the first display area AA1 and the third display area AA3 is 3N. When the value of the second preset refresh rate of the display panel 200 is 240 Hz, the number of the first pixel units 20 in the first display area AA1 and the third display area AA3 is 4N. When the value of the second preset refresh rate of the display panel 200 is 360 Hz, the number of the first pixel units 20 in the first display area AA1 and the third display area AA3 is 6N. The number of the second pixel units 30 in the second display area AA2 corresponds to the number of the first pixel units 20 in the first display area AA1. For example, the number of the first pixel units 20 in the first display area AA1 is 2N, and the number of the second pixel units 30 in the second display area AA2 is also 2N. The number of the first pixel units 20 in the first display area AA1 is 3N, and the number of the second pixel units 30 in the second display area AA2 is also 3N.

In the embodiment of the present disclosure, an area of the second display area AA2 is greater than an area of the first display area AA1. The area of the second display area AA2 is also greater than an area of the third display area AA3. The area of the first display area AA1 is equal to the area of the third display area AA3. Furthermore, the area of the first display area AA1 and the area of the third display area AA3 may not be equal. Specifically, the number of the first pixel units 20 in the first display area AA1 is less than the number of the second pixel units 30 in the second display area AA2. The number of the first pixel units 20 in the third display area AA3 is less than the number of the second pixel units 30 in the second display area AA2. As shown in FIG. 2, the number of the first pixel units 20 is less than the number of the second pixel units 30 electrically connected to the same data line D.

Specifically, the display panel 200 includes a plurality of scan lines G, a plurality of data lines D, and a plurality of sub-pixels 10. The plurality of scan lines G are arranged along a first direction Y. The plurality of data lines D are arranged along a second direction X. The second direction X intersects the first direction Y. Each of the scan lines G is electrically connected to the plurality of sub-pixels 10 arranged along the second direction X. The plurality of sub-pixels 10 are divided into a first pixel column 101 and a second pixel column 102. The first pixel column 101 and the second pixel column 102 are arranged adjacent to each other along the second direction X. The first pixel column 101 includes a plurality of first pixel units 20 arranged along the first direction Y. The second pixel column 102 includes a plurality of second pixel units 30 arranged along the first direction Y. At least two adjacent first pixel units 20 and at least two adjacent second pixel units 30 are electrically connected to the same data line D.

In the embodiment of the present disclosure, each of the first pixel unit 20 and the second pixel unit 30 includes three sub-pixels 10 arranged along the first direction Y. Colors of the three sub-pixels 10 are different from each other. Specifically, the colors of the three sub-pixels 10 are red, green, and blue, respectively. The colors of the sub-pixels 10 can also be other colors.

In the embodiment of the present disclosure, the sub-pixels 10 of the same color in at least two adjacent first pixel units 20 electrically connected to the same data line D are turned on simultaneously. For example, red sub-pixels 10 in two adjacent first pixel units 20 electrically connected to the same data line D are turned on at the same time. Alternatively, the sub-pixels 10 of the same color in at least two adjacent second pixel units 30 electrically connected to the same data line D are turned on simultaneously. For example, green sub-pixels 10 in two adjacent second pixel units 30 electrically connected to the same data line D are turned on at the same time.

Specifically, the plurality of sub-pixels 10 in each row of the sub-pixels 10 have the same color. The plurality of rows of the sub-pixels 10 are divided into multiple sub-pixel row repeating units. Each sub-pixel row repeating unit includes three adjacent rows of the sub-pixels 10 with different colors. For example, the sub-pixel row repeating unit includes a row of the red sub-pixels 10, a row of the green sub-pixels 10, and a row of the blue sub-pixels 10. Each row of the sub-pixels 10 is electrically connected to one scan line G. The data line D is electrically connected to a corresponding column of the sub-pixels 10.

In the embodiment of the present disclosure, a number of the first pixel units 20 and a number of the second pixel units 30 electrically connected to the same data line D are equal. Specifically, the number of the first pixel units 20 is equal to the number of second pixel units 30 electrically connected to each data line D.

In the embodiment of the present disclosure, the data signals transmitted by two adjacent data lines D have opposite polarities, and at least some of the data lines D transmit the data signals to the sub-pixels 10 at different times. By setting the opposite polarities of the data signals transmitted by the two adjacent data lines D, coupling capacitances between the sub-pixel 10 and the two adjacent data lines D can be eliminated and the display quality can be improved. At least some of the data lines D transmit the data signals to the sub-pixels 10 at different times, causing charging times of the sub-pixels 10 to be different, and thus the display time are different, which is conducive to displaying the specified sub-pixels 10 within a preset time to display a preset frame of a display image.

The other structures of the display panel 200 are the same as those of the display panel 100, so they will not be described again here.

In the display panel 200 provided in the embodiment of the present disclosure, the display panel 200 is divided into a first display area AA1, a second display area AA2, and a third display area AA3. There are only the first pixel units 20 in the first display area AA1 and the third display area AA3. There are only the second pixel units 30 in the second display area AA2. The second display area AA2 is a middle area of the display panel 200, and an area of the second display area AA2 is greater than that of the first display area AA1 and the third display area AA3. Moreover, at least two adjacent first pixel units 20 and at least two adjacent second pixel units 30 are electrically connected to the same data line D, so that when the display panel 200 switches from the first preset refresh rate to the second preset refresh rate, the sub-pixels 10 of the same color in at least two first pixel units 20 of the first pixel column 101 can be scanned at the same time. Alternatively, the sub-pixels 10 of the same color in at least two second pixel units 30 of the second pixel column 102 are scanned at the same time. Therefore, the multiple sub-pixels 10 displayed simultaneously by the display panel 200 at the second preset refresh rate are controlled to be located in the same pixel column to prevent pixel misalignment and improve the resolution of the display panel 200.

Figure 5:
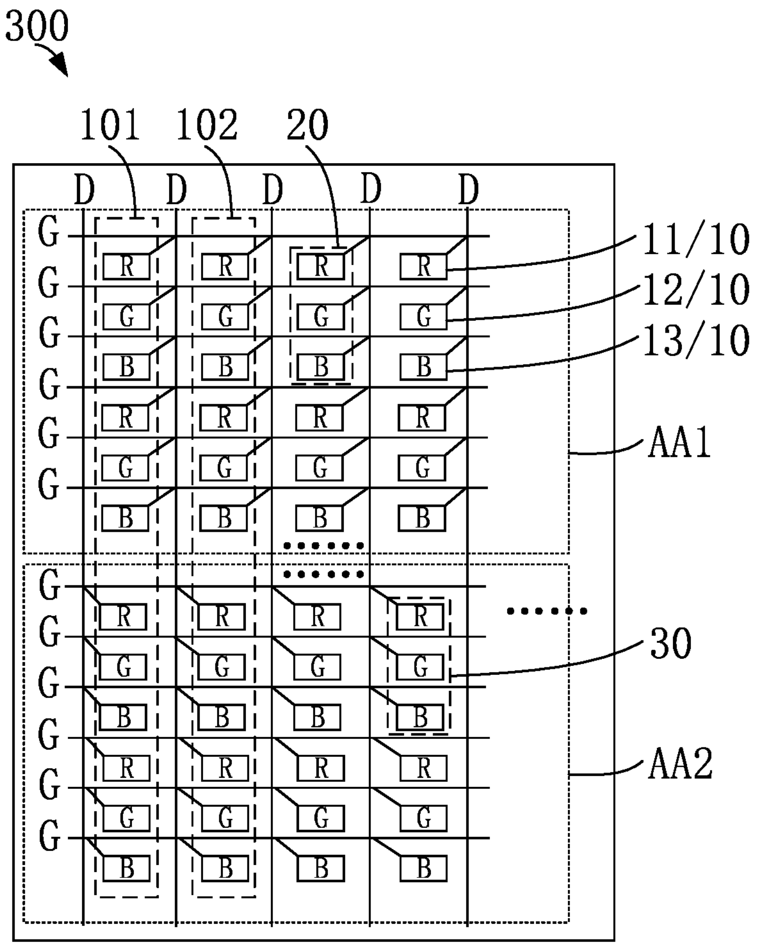
FIG. 5 is a schematic diagram of a display panel of a third embodiment of the present disclosure.

As shown in FIG. 5, an embodiment of the present disclosure provides a display panel 300. Differences between the display panel 300 and the display panel 100 are as follows. The display panel 300 includes a first display area AA1 and a second display area AA2 adjacent along the first direction Y. The first display area AA1 is provided with at least two first pixel units 20, and the second display area AA2 is provided with at least two second pixel units 30.

In the embodiment of the present disclosure, a number of the first pixel units 20 in the first display area AA1 can be adjusted accordingly according to a value of the second preset refresh rate of the display panel (the value of the first preset refresh rate is 60 Hz). For example, when the value of the second preset refresh rate of the display panel 300 is 120 Hz, the number of the first pixel units 20 in the first display area AA1 is 2N. When the value of the second preset refresh rate of the display panel 300 is 180 Hz, the number of the first pixel units 20 in the first display area AA1 is 3N. When the value of the second preset refresh rate of the display panel 300 is 240 Hz, the number of the first pixel units 20 in the first display area AA1 is 4N. When the value of the second preset refresh rate of the display panel 300 is 360 Hz, the number of the first pixel units 20 in the first display area AA1 is 6N. A number of the second pixel units 30 in the second display area AA2 corresponds to the number of the first pixel units 20 in the first display area AA1. For example, the number of the first pixel units 20 in the first display area AA1 is 2N, and the number of the second pixel units 30 in the second display area AA2 is also 2N. The number of the first pixel units 20 in the first display area AA1 is 3N, and the number of the second pixel units 30 in the second display area AA2 is also 3N.

In the embodiment of the present disclosure, an area of the second display area AA2 is equal to an area of the first display area AA1. Specifically, the area of the first display area AA1 and an area of the third display area AA3 may not be equal.

In the embodiment of the present disclosure, the number of the first pixel units 20 in the first display area AA1 is equal to the number of the second pixel units 30 in the second display area AA2. The number of the first pixel units 20 in the first display area AA1 may also be less than the number of the second pixel units 30 in the second display area AA2. As shown in FIG. 3, the number of the first pixel units 20 is equal to the number of the second pixel units 30 electrically connected to the same data line D.

Specifically, the display panel 300 includes a plurality of scan lines G, a plurality of data lines D, and a plurality of sub-pixels 10. The plurality of scan lines G are arranged along a first direction Y. The plurality of data lines D are arranged along a second direction X. The second direction X intersects the first direction Y. Each of the scan lines G is electrically connected to the plurality of sub-pixels 10 arranged along the second direction X. The plurality of sub-pixels 10 are divided into a first pixel column 101 and a second pixel column 102. The first pixel column 101 and the second pixel column 102 are arranged adjacent to each other along the second direction X. The first pixel column 101 includes a plurality of first pixel units 20 arranged along the first direction Y. The second pixel column 102 includes a plurality of second pixel units 30 arranged along the first direction Y. At least two adjacent first pixel units 20 and at least two adjacent second pixel units 30 are electrically connected to the same data line D.

In the embodiment of the present disclosure, each of the first pixel unit 20 and the second pixel unit 30 includes three sub-pixels 10 arranged along the first direction Y. Colors of the three sub-pixels 10 are different from each other. Specifically, the colors of the three sub-pixels 10 are red, green, and blue, respectively. The colors of the sub-pixels 10 can also be other colors.

In the embodiment of the present disclosure, the sub-pixels 10 of the same color in at least two adjacent first pixel units 20 electrically connected to the same data line D are turned on simultaneously. For example, red sub-pixels 10 in two adjacent first pixel units 20 electrically connected to the same data line D are turned on at the same time. Alternatively, the sub-pixels 10 of the same color in at least two adjacent second pixel units 30 electrically connected to the same data line D are turned on simultaneously. For example, green sub-pixels 10 in two adjacent second pixel units 30 electrically connected to the same data line D are turned on at the same time.

Specifically, the plurality of sub-pixels 10 in each row of the sub-pixels 10 have the same color. The plurality of rows of the sub-pixels 10 are divided into multiple sub-pixel row repeating units. Each sub-pixel row repeating unit includes three adjacent rows of the sub-pixels 10 with different colors. For example, the sub-pixel row repeating unit includes a row of the red sub-pixels 10, a row of the green sub-pixels 10, and a row of the blue sub-pixels 10. Each row of the sub-pixels 10 is electrically connected to one scan line G. The data line D is electrically connected to a corresponding column of the sub-pixels 10.

In the embodiment of the present disclosure, a number of the first pixel units 20 and a number of the second pixel units 30 electrically connected to the same data line D are equal. Specifically, the number of the first pixel units 20 is equal to the number of second pixel units 30 electrically connected to each data line D.

In the embodiment of the present disclosure, the data signals transmitted by two adjacent data lines D have opposite polarities, and at least some of the data lines D transmit the data signals to the sub-pixels 10 at different times. By setting the opposite polarities of the data signals transmitted by the two adjacent data lines D, coupling capacitances between the sub-pixel 10 and the two adjacent data lines D can be eliminated and the display quality can be improved. At least some of the data lines D transmit the data signals to the sub-pixels 10 at different times, causing charging times of the sub-pixels 10 to be different, and thus the display time are different, which is conducive to displaying the specified sub-pixels 10 within a preset time to display a preset frame of a display image.

The other structures of the display panel 300 are the same as those of the display panel 100, so they will not be described again here.

In the display panel 300 provided in the embodiment of the present disclosure, the display panel 300 is divided into a first display area AA1 and a second display area AA2. There are only the first pixel units 20 in the first display area AA1. There are only the second pixel units 30 in the second display area AA2. Moreover, at least two adjacent first pixel units 20 and at least two adjacent second pixel units 30 are electrically connected to the same data line D, so that when the display panel 300 switches from the first preset refresh rate to the second preset refresh rate, the sub-pixels 10 of the same color in at least two first pixel units 20 of the first pixel column 101 can be scanned at the same time. Alternatively, the sub-pixels 10 of the same color in at least two second pixel units 30 of the second pixel column 102 are scanned at the same time. Therefore, the multiple sub-pixels 10 displayed simultaneously by the display panel 300 at the second preset refresh rate are controlled to be located in the same pixel column to prevent pixel misalignment and improve the resolution of the display panel 300.

Figure 6:
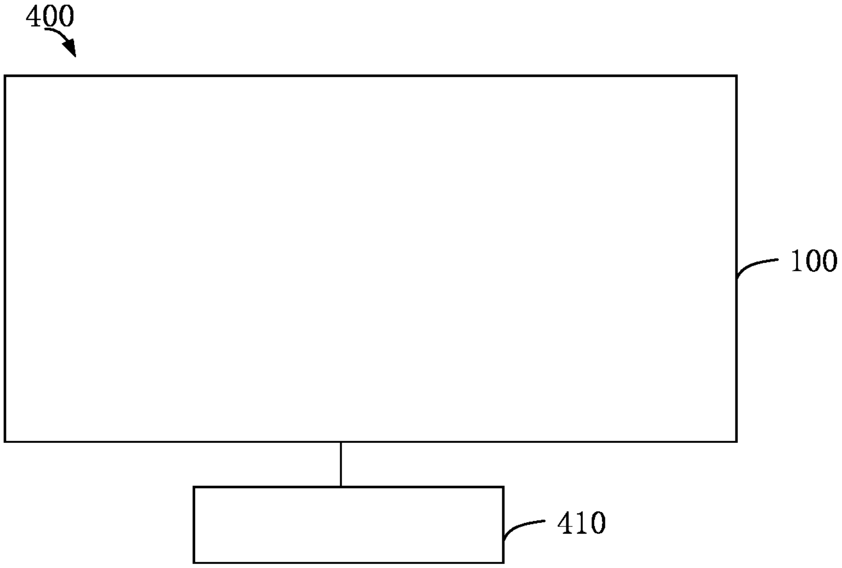
FIG. 6 is a schematic diagram of a display device of an embodiment of the present disclosure.

As shown in FIG. 6, an embodiment of the present disclosure provides a display device 400, including the above-mentioned display panel 100/200/300 and a driving circuit 410. The display panel 100/200/300 is electrically connected to the driving circuit 410. The driving circuit 410 is configured to drive the display panel 100/200/300.

Figure 7:
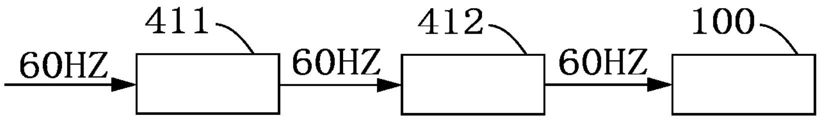
FIG. 7 is a first driving schematic diagram of a display device of an embodiment of the present disclosure.

Specifically, the driving circuit 410 includes a system chip 411 and a timing controller 412. The system chip 411 is electrically connected to the timing controller 412. The timing controller 412 is electrically connected to the display panel. As shown in FIG. 7, the system chip 411 is configured to receive image data of the display panel to provide corresponding driving data to the timing controller 412. The timing controller 412 provides the display panel with scanning signals and data signals corresponding to the refresh rate according to the driving data to control the display panel to display a frame of a display image. In FIG. 7, the refresh rate is 60 Hz as an example.

Figure 8:
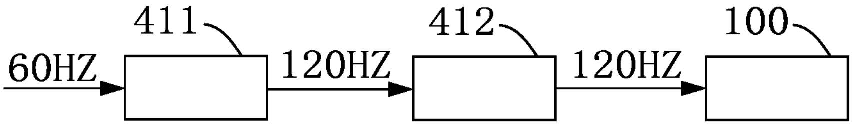
FIG. 8 is a second driving schematic diagram of a display device of an embodiment of the present disclosure.

As shown in FIG. 8, when a user performs a refresh rate switching operation, such as switching from 60 Hz to 120 Hz, the system chip 411 sends a refresh rate switching command to the timing controller 412 through a signal line in a preset interface. After receiving the command, the timing controller 412 sends a feedback signal to the system chip 411 through the signal line. After receiving the feedback signal, the system chip 411 determines whether a current refresh rate and a refresh rate after switching are the same. If the current refresh rate and the refresh rate after switching are not the same, the system chip 411 sends the driving data corresponding to the refresh rate after switching to the timing controller 412. The timing controller 412 provides the display panel with scanning signals and data signals corresponding to the refresh rate according to the driving data to control the display panel to display a frame of a display image.

The above describes in detail the display panel and the display device provided by the embodiments of the present disclosure. The description of the above embodiments is only used to help understand the core idea of the present disclosure. The above description should not be construed as limiting the scope of the present disclosure.

What is claimed is:

1. A display panel, comprising:

a plurality of scan lines arranged along a first direction;

a plurality of data lines arranged along a second direction, wherein the second direction intersects the first direction; and a plurality of sub-pixels, wherein each of the scan lines is electrically connected to a row of the sub-pixels arranged along the second direction, the plurality of sub-pixels comprise a first pixel column and a second pixel column, the first pixel column and the second pixel column are arranged adjacent to each other along the second direction, the first pixel column comprises a plurality of first pixel units arranged along the first direction, the second pixel column comprises a plurality of second pixel units arranged along the first direction, each of the first pixel unit and the second pixel unit comprises three sub-pixels arranged along the first direction, and colors of the three sub-pixels are different from each other; and wherein at least two adjacent first pixel units and at least two adjacent second pixel units are electrically connected to a same data line;

wherein the display panel at least comprises a first display mode and a second display mode, in the first display mode, a refresh rate of the display panel is a first preset refresh rate, in the second display mode, the refresh rate of the display panel is a second preset refresh rate, the second preset refresh rate is N times the first preset refresh rate, and N is a positive integer greater than 1; and in the second display mode, the sub-pixels of a same color in the at least two adjacent first pixel units electrically connected to the same data line are turned on simultaneously, or the sub-pixels of the same color in the at least two adjacent second pixel units electrically connected to the same data line are turned on simultaneously.

2. The display panel of claim 1, wherein a period during which the display panel displays one frame of a display image comprises a scan cycle, the scan cycle comprises a first sub-scan cycle and a second sub-scan cycle that are continuous in time, a number of the first pixel units scanned in the first sub-scan cycle is equal to a number of second pixel units scanned in the second sub-scan cycle.

3. The display panel of claim 1, wherein each of the first pixel unit and the second pixel unit comprises a first sub-pixel, a second sub-pixel, and a third sub-pixel arranged along the first direction;

the display panel further comprises a first gate driving unit, a second gate driving unit, and a third gate driving unit connected in cascade, the first gate driving unit receives a first clock signal and is electrically connected to a corresponding first sub-pixel through the scan line, the second gate driving unit receives a second clock signal and is electrically connected to a corresponding second sub-pixel through the scan line, and the third gate driving unit receives a third clock signal and is electrically connected to a corresponding third sub-pixel through the scan line;

a time difference between a time when the first clock signal switches from a low level to a high level and a time when the second clock signal switches from the low level to the high level ranges from 2 microseconds to 3 microseconds, and a time difference between the time when the second clock signal switches from the low level to the high level and a time when the third clock signal switches from the low level to the high level ranges from 2 microseconds to 3 microseconds.

4. The display panel of claim 3, wherein the second clock signal is turned on while the first clock signal remains at the high level, the second clock signal is turned off while the third clock signal remains at the high level, and the third clock signal switches from the low level to the high level when the first clock signal switches from the high level to the low level.

5. The display panel of claim 3, wherein every two of the first pixel units are arranged adjacently along the first direction, and every two of the second pixel units are arranged adjacently along the first direction, and at least part of the first pixel units and the second pixel units are alternatively arranged along the first direction.

6. The display panel of claim 3, wherein the first clock signal switches from the low level to the high level while the third clock signal remains at the high level.

7. The display panel of claim 1, wherein a number of the first pixel units and a number of the second pixel units electrically connected to the same data line are equal.

8. The display panel of claim 1, wherein data signals transmitted by two adjacent data lines have opposite polarities, and at least some of the data lines transmit data signals to corresponding sub-pixel at different times.

9. The display panel of claim 1, wherein a number of the second pixel units adjacently arranged along the first direction corresponds to a number of the first pixel units adjacently arranged along the first direction.

10. A display device, comprising a display panel and a driving circuit, wherein the display panel is electrically connected to the driving circuit, and the driving circuit is configured to drive the display panel;

wherein the display panel comprises:

a plurality of scan lines arranged along a first direction;

a plurality of data lines arranged along a second direction, wherein the second direction intersects the first direction; and a plurality of sub-pixels, wherein each of the scan lines is electrically connected to a row of the sub-pixels arranged along the second direction, the plurality of sub-pixels comprise a first pixel column and a second pixel column, the first pixel column and the second pixel column are arranged adjacent to each other along the second direction, the first pixel column comprises a plurality of first pixel units arranged along the first direction, the second pixel column comprises a plurality of second pixel units arranged along the first direction, each of the first pixel unit and the second pixel unit comprises three sub-pixels arranged along the first direction, and colors of the three sub-pixels are different from each other; and wherein at least two adjacent first pixel units and at least two adjacent second pixel units are electrically connected to a same data line;

wherein the driving circuit comprises a system chip and a timing controller, the system chip is electrically connected to the timing controller, and the timing controller is electrically connected to the display panel; and wherein the system chip is configured to send a command to switch a refresh rate to the timing controller, the timing controller is configured to send a feedback signal to the system chip according to the command to switch the refresh rate, the system chip is also configured to determine whether a current refresh rate is the same as a refresh rate after switching based on the feedback signal, in response to the current refresh rate being different from the refresh rate after switching, driving data corresponding to the refresh rate after switching is sent to the timing controller, and the timing controller is also configured to provide the display panel with scanning signals and data signals corresponding to the refresh rate after switching according to the driving data, so as to control a display image of the display panel.

11. The display device of claim 10, wherein the display panel at least comprises a first display mode and a second display mode, in the first display mode, a refresh rate of the display panel is a first preset refresh rate, in the second display mode, the refresh rate of the display panel is a second preset refresh rate, the second preset refresh rate is N times the first preset refresh rate, and N is a positive integer greater than 1; and in the second display mode, the sub-pixels of a same color in the at least two adjacent first pixel units electrically connected to the same data line are turned on simultaneously, or the sub-pixels of the same color in the at least two adjacent second pixel units electrically connected to the same data line are turned on simultaneously.

12. The display device of claim 11, wherein a period during which the display panel displays one frame of a display image comprises a scan cycle, the scan cycle comprises a first sub-scan cycle and a second sub-scan cycle that are continuous in time, a number of the first pixel units scanned in the first sub-scan cycle is equal to a number of second pixel units scanned in the second sub-scan cycle.

13. The display device of claim 11, wherein each of the first pixel unit and the second pixel unit comprises a first sub-pixel, a second sub-pixel, and a third sub-pixel arranged along the first direction;

the display panel further comprises a first gate driving unit, a second gate driving unit, and a third gate driving unit connected in cascade, the first gate driving unit receives a first clock signal and is electrically connected to a corresponding first sub-pixel through the scan line, the second gate driving unit receives a second clock signal and is electrically connected to a corresponding second sub-pixel through the scan line, and the third gate driving unit receives a third clock signal and is electrically connected to a corresponding third sub-pixel through the scan line;

a time difference between a time when the first clock signal switches from a low level to a high level and a time when the second clock signal switches from the low level to the high level ranges from 2 microseconds to 3 microseconds, and a time difference between the time when the second clock signal switches from the low level to the high level and a time when the third clock signal switches from the low level to the high level ranges from 2 microseconds to 3 microseconds.

14. The display device of claim 13, wherein the second clock signal is turned on while the first clock signal remains at the high level, the second clock signal is turned off while the third clock signal remains at the high level, and the third clock signal switches from the low level to the high level when the first clock signal switches from the high level to the low level.

15. The display device of claim 13, wherein every two of the first pixel units are arranged adjacently along the first direction, and every two of the second pixel units are arranged adjacently along the first direction, and at least part of the first pixel units and the second pixel units are alternatively arranged along the first direction.

16. The display device of claim 13, wherein the first clock signal switches from the low level to the high level while the third clock signal remains at the high level.

17. The display device of claim 10, wherein a number of the first pixel units and a number of the second pixel units electrically connected to the same data line are equal.

18. The display device of claim 10, wherein data signals transmitted by two adjacent data lines have opposite polarities, and at least some of the data lines transmit data signals to corresponding sub-pixel at different times.

19. A display panel, comprising:

a plurality of scan lines arranged along a first direction;

a plurality of data lines arranged along a second direction, wherein the second direction intersects the first direction; and a plurality of sub-pixels, wherein each of the scan lines is electrically connected to a row of the sub-pixels arranged along the second direction, the plurality of sub-pixels comprise a first pixel column and a second pixel column, the first pixel column and the second pixel column are arranged adjacent to each other along the second direction, the first pixel column comprises a plurality of first pixel units arranged along the first direction, the second pixel column comprises a plurality of second pixel units arranged along the first direction, each of the first pixel unit and the second pixel unit comprises three sub-pixels arranged along the first direction, and colors of the three sub-pixels are different from each other, wherein at least two adjacent first pixel units and at least two adjacent second pixel units are electrically connected to a same data line, and the three sub-pixels of each of the two adjacent first pixel units and the three sub-pixels of each of the two adjacent second pixel units are electrically connected to the same data line.

* * * * *